Dec. 2, 1952  J. L. KING  2,620,391
POSITION TRANSMITTER
Filed Feb. 20, 1951  2 SHEETS—SHEET 1

INVENTOR
JACK L. KING,
BY Martin E. Hogan Jr.
ATTORNEY

Dec. 2, 1952   J. L. KING   2,620,391
POSITION TRANSMITTER

Filed Feb. 20, 1951   2 SHEETS—SHEET 2

INVENTOR
JACK L. KING,
BY Martin E. Hogan Jr.
ATTORNEY

Patented Dec. 2, 1952

2,620,391

UNITED STATES PATENT OFFICE 2,620,391

POSITION TRANSMITTER

Jack L. King, Middle River, Md., assignor to The Glenn L. Martin Company, Middle River, Md., a corporation of Maryland Application February 20, 1951, Serial No. 211,861

3 Claims. (Cl. 177—380)

1

This invention relates to electro-mechanical position transmitters of the type adapted to indicate relative movement of a member at some remote location such as in an aircraft where the indicator is carried in the cabin for measuring, say, the deflection of an aileron in the outer portion of the wing. The mechanical movement of the aileron controls the voltage output of a position transmitter linked to its actuating mechanism to produce a reading on the dial indicator accurately representing that movement.

In the performance of an aircraft testing program it is essential to accurately determine the positions of the control surfaces during various flight maneuvers in order to evaluate the flying qualities. This is generally done using devices of this type and photographing the readings given on the indicator in the cabin to provide data for subsequent engineering analyses.

In the prior art devices, operation of the transmitter is controlled by a rotatable shaft extending through the end of the housing. A linkage system, clamped to the shaft, causes it to rotate in accordance with the movement of the control surface. Mechanical stops inside the transmitter limit the rotation of the shaft to prevent damage to the instrument. These stops, being inside the housing are not visible, and as a result, cause considerable difficulty in installing the transmitter so that the shaft will be allowed sufficient rotation in the proper direction. Quite frequently the transmitter is mounted with the shaft positioned to allow only slight rotation in one direction before encountering the stop when it should be mounted so that the shaft is allowed to rotate from a centered position or from a position near the opposite stop. This either damages the instrument or causes it to shift or slip relative to the linkage when the control surface is deflected, requiring that the transmitter be replaced or re-calibrated.

The available space in an aircraft wing or control surface is of course limited, requiring that the transmitter be quite small and compact. It is not possible to measure the movements of many vital components in a thin wing by use of conventional devices because of their bulkiness. Therefore, one of the objects of this invention is to provide a motion transmitter which is specially adapted to small, compact construction.

Another object of this invention is to provide a lightweight motion transmitter adapted to withstand shock loads and vibrations incident to flight test aircraft.

Still another object of this invention is to pro-

2 vide a motion transmitter that will dependably maintain a predetermined power output variation relative to the movements of a control surface associated therewith.

Further and other objects will become apparent from the accompanying description and drawings which form a part of this disclosure and in which like numerals refer to like parts.

Figure 1:
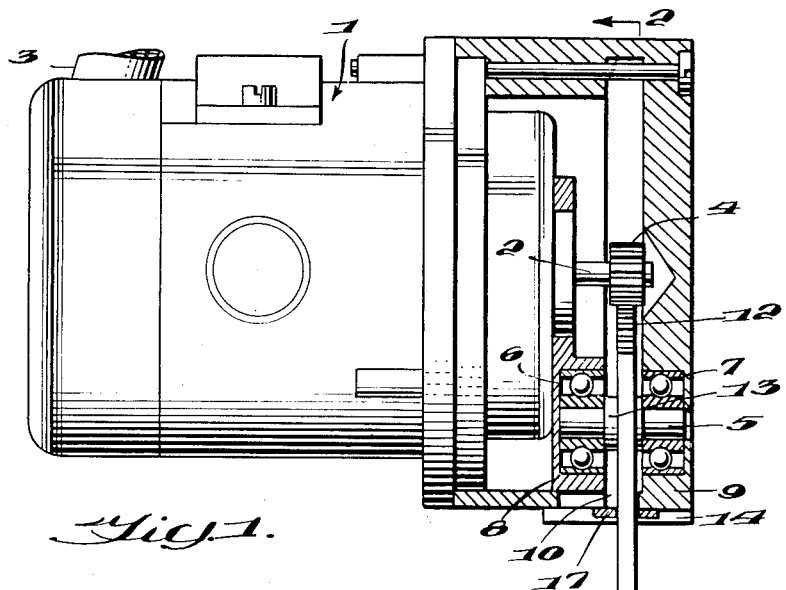
Figure 1 is a fragmentary side view of the motion transmitter of this invention.
Figure 2:
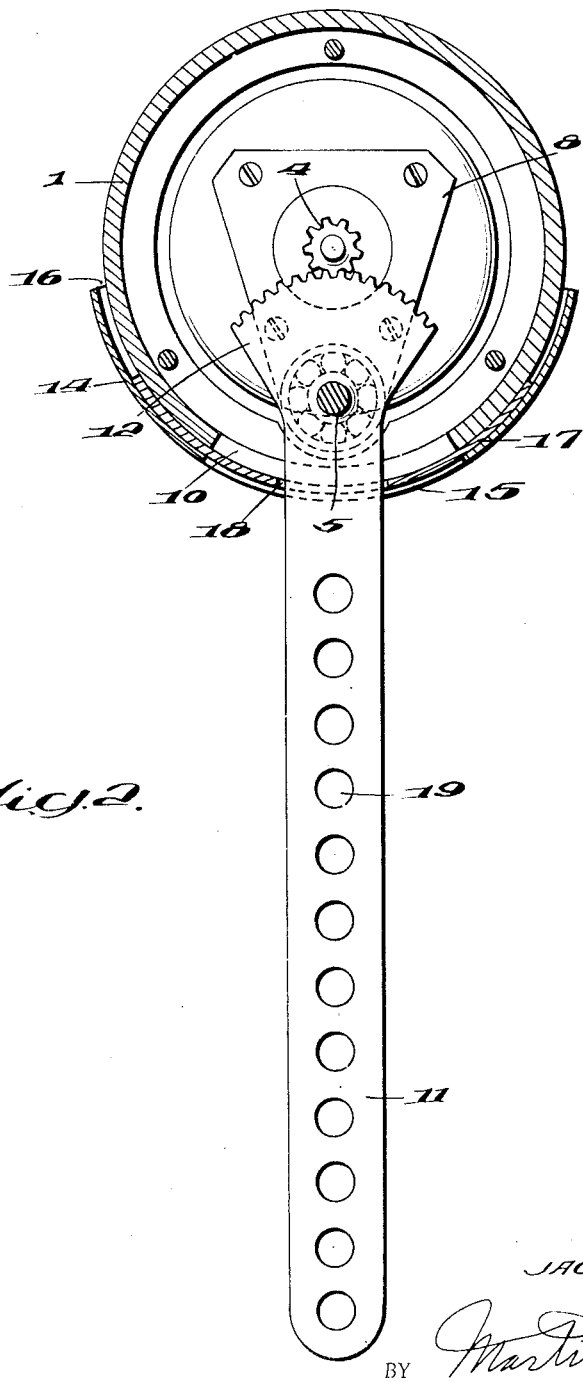
Figure 2 is a sectional view of the motion transmitter taken on the line 2—2 of Figure 1.

Generally tubular housing 1 of the motion transmitter shown in Figures 1 and 2 houses a conventional voltage generator of the selsyn type, the output of which is controlled by the rotational position of a shaft 2. The output voltages are transmitted from the generator through an electrical lead 3 to control a dial indicator (not shown) at some remote location. A pinion 4 is fixedly mounted on the free end of shaft 2 for causing rotation thereof. A second shaft 5, the axis of which is generally parallel to the axis of shaft 2 and displaced radially therefrom, is rotatably carried at each end by bearings 6 and 7 seated in supporting members 8 and 9 forming a part of housing 1. A slot 10, the major axis of which lies in a plane normal to the axis of shaft 5, provides an opening into the housing through which arm 11 extends to rigidly connect with shaft 5 between bearings 6 and 7. The inner end of arm 11 beyond shaft 5 is formed as a sector gear 12 which meshes with pinion 4. This construction allows a large gear ratio between the sector gear and the pinion for obtaining a high degree of accuracy while occupying a minimum of space. To relieve the stresses on the connection between arm 11 and shaft 5 caused by side forces acting on the arm, washerlike shims 13 are carried on the shaft to butt against the arm and against the inner races of bearings 6 and 7. Of course, the shims could easily be replaced by increasing the thickness of the arm around the shaft or by having the inner races of the bearings protrude so as to engage the arm.

Additional support for arm 11, including a slotted guide plate 14 is secured to housing 1 and forming a part thereof surrounding slot 10 through which arm 11 projects. Slot 15 in guide plate 14 substantially mates with slot 10 in housing 1 to limit the swinging movement of arm 11.

A slide way 16 on the underside of guide plate 14 extends the full length thereof, parallel and in line with slot 15. An arcuate sliding member 17 is carried in slide way 16 between guide plate 14 and housing 1 so as to move with arm 11 as it swings about the axis of its supporting shaft. An opening 18 in the sliding member 17, substantially the size and shape of the portion of arm 11 extending therethrough, cooperates with the pivotal support for arm 11 to restrict its movement to that of swinging in a plane normal to the axis of shaft 2 irrespective of any side loads. Since arm 11 will move angularly with respect to member 17 as it pivots about the axis of shaft 5, opening 18 is made slightly longer than the width of arm 11 to permit such movement without binding. Sliding member 17 not only provides support against side loads for arm 11, but also closes slots 10 and 15 in the housing to prevent the entry of dust and dirt.

The portion of arm 11 extending radially from housing 1 is provided with a plurality of holes 19 drilled at predetermined distances from the axis of shaft 5 so that the angular or swinging movement of the arm may be regulated in accordance with the movement of the member connected thereto. For example if the control surface linkage has a large travel, it would be connected to arm 11 as far as possible from shaft 5 so that its angular travel would not exceed the maximum allowed. If, on the other hand, the control surface linkage moves only a small distance, it would be connected to arm 11 through a hole close to shaft 5. In all cases, the connection should be made so that the arm will move substantially throughout the angular distance allowed to realize the greatest accuracy.

Figure 3:
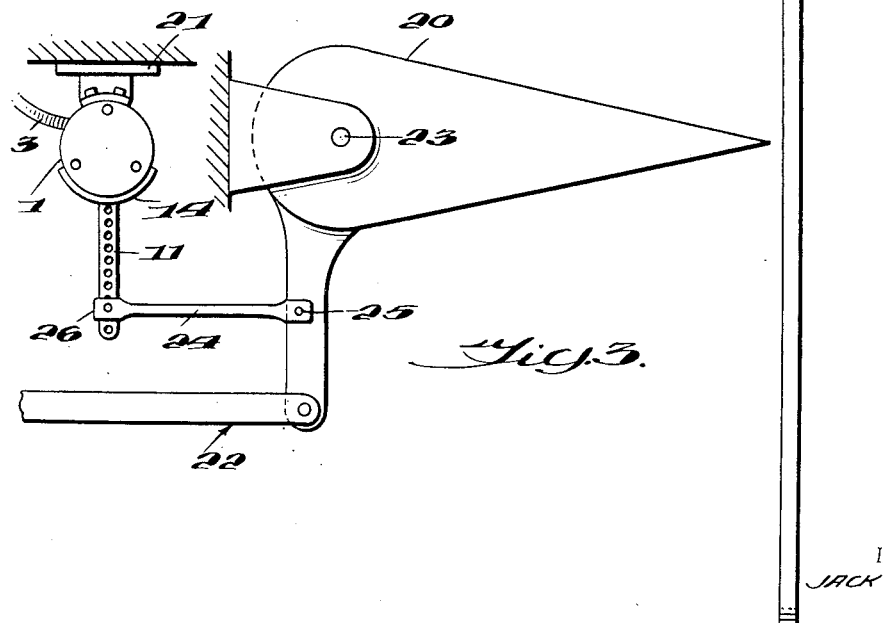
Figure 3 shows schematically, a typical transmitter installation for measuring the movement of an aircraft control surface.

A typical installation of the motion transmitter is shown schematically in Figure 3. Transmitter housing 1 and the movable control surface 20 are secured to suitable supporting structure 21 forming a part of the aircraft. Control surface actuating linkage 22 causes the control surface to pivot about its hinge 23 and thereby provide a means for maneuvering the aircraft. A connecting rod 24 pivotally carried at one end 25 by linkage 22 and at its other end 26 by arm 11, swings arm 11 an amount proportional to and in accordance with the deflection of control surface 20 so as to generate a voltage output from the transmitter representing that deflection.

As arm 11 is caused to swing about the axis of shaft 5, sector gear 12 meshing with pinion 4 causes rotation of shaft 2. This shaft rotation controls the voltage output from the transmitter which in turn is used to control an indicator calibrated to read the movement of the member or control surface to which arm 11 is connected.

The transmitter having arm 11 extending radially therefrom and adapted to swing within the limits of the slot formed in the housing is easily installed so that the desired movement of arm 11 is obtained whereas with conventional equipment the shaft position relative to the hidden stops is practically impossible to determine, introducing a major installation problem. When the limits of operation of such a transmitter are reached, additional movement tending to make it operate beyond those limits obviously causes damage and forces the instrument out of calibration.

Sliding members 17 carried by guide plate 14 adds considerably to the ruggedness of the transmitter and prevents inaccuracies which would result from side load deflections in arm 11. Side forces acting on the arm are resisted by what is essentially a couple acting between the member 17 and shaft 5. Thus only axial forces are applied to the shaft instead of bending moments which would otherwise be present. This construction, then, assures proper engagement of the sector gear with the pinion to maintain the required transmitter accuracy by eliminating angular deflections in the arm and shaft. In addition, sliding member 17 keeps harmful particles such as dust and dirt out of the housing and away from the gears and bearings thereby increasing the life of the transmitter. Since the tolerances are critical on these parts, excessive wear caused by foreign particles entering the housing would be quite destructive.

The transmitter of this invention, by virtue of the construction set forth hereinabove, is small and compact as compared with similar instruments now known in the art and is therefore capable of a wider use. The swingable arm simplifies proper installation of the transmitter and results in a more integral unit better adapted to resist vibrations and other forces tending to destroy the accuracy of the instrument.

Though the transmitter is particularly adapted to aircraft, it may be equally as useful in other fields of engineering.

It is to be understood that certain changes, alterations, modifications and substitutions can be made without departing from the spirit and scope of the appended claims.

I claim as my invention:

1. In an electro-mechanical position transmitter having a generally tubular housing and a shaft rotatably carried within said housing for controlling an electrical output signal indicating shaft position at some remote location, a pinion carried on said shaft at one end thereof, a second shaft carried within said housing parallel with said first mentioned shaft and displaced radially therefrom, said second shaft being supported at either end thereof by bearings carried in said housing for rotational movement only, a circumferential slot formed in said housing, an arm extending through said slot and fixedly carried by said second shaft between said bearings, the inner end of said arm beyond said second shaft forming a sector gear adapted to mesh with said pinion and cause rotation thereof upon swinging movement of said arm about the axis of said second shaft within the limits of said slot, the opposite end of said arm exteriorly of said housing being adapted to operatively connect with a movable member, the positions of which are to be measured, and slot closure means carried by said housing including a guide plate having a slot formed therein mating said first mentioned slot, ways formed in said plate on either side of and parallel with said slot and a sliding member interposed between said plate and housing adapted for movement in said ways, said sliding member having an opening formed therein for closely receiving said arm, said member coacting with said arm and said guide plate to resist side loads on said arm and to close said slots.

2. In an electro-mechanical position transmitter having a generally tubular housing and a shaft rotatably carried within said housing for controlling an electrical output signal indicating shaft position at some remote location, a pinion carried on said shaft at one end thereof, a second shaft carried within said housing parallel with said first mentioned shaft and displaced radially therefrom, a slot formed in said housing and extending in a plane normal to the axis of said shaft, an arm extending through said slot and connecting with said second shaft for swinging movement about the axis thereof, the inner end of said arm beyond said second shaft forming a sector gear adapted to mesh with said pinion, a guide plate carried exteriorly of said housing and having a slot formed therein through which said arm extends for swinging movement, and a sliding member interposed between said plate and housing and adapted for movement in a direction normal to the axis of said second shaft and having an opening formed therein for closely receiving said arm, said member coacting with said arm and said guide plate to resist side loads on said arm and to close said slots.

3. An electro-mechanical position transmitter having a generally tubular housing and a shaft rotatably carried within said housing for controlling an electrical output signal indicating shaft position at some remote location, a pinion carried on said shaft at one end thereof, a second shaft carried within said housing parallel with said first mentioned shaft and displaced radially therefrom, a slot formed in said housing and extending in a plane normal to the axis of said second shaft, an arm extending through said slot and connecting with said second shaft for swinging movement about the axis thereof, said arm including a sector gear formed at its inner end beyond said second shaft adapted to mesh with said pinion whereby swinging motion of said arm causes rotation of said first mentioned shaft, and guide means carried by said housing for resisting side loads acting on said arm and for closing the slot in said housing.

JACK L. KING.

REFERENCES CITED

The following references are of record in the file of this patent:

UNITED STATES PATENTS

| Number | Name | Date |
| --- | --- | --- |
| 310,323 | Schmid | Jan. 6, 1885 |
| 1,912,831 | Evans | June 6, 1933 |
| 2,419,087 | Peterson et al. | Apr. 15, 1947 |